May 19, 1936.  R. SAVY  2,041,091

METHOD FOR REMOVING BISCUITS FROM OVEN CONVEYERS

Filed Sept. 6, 1935

ROBERT SAVY
INVENTOR

BY George B Willcox

ATTORNEY

Patented May 19, 1936

2,041,091

UNITED STATES PATENT OFFICE 2,041,091

METHOD FOR REMOVING BISCUITS FROM OVEN CONVEYERS

Robert Savy, Courbevoie, France, assignor to Baker Perkins Company, Inc., Saginaw, Mich., a corporation of New York Application September 6, 1935, Serial No. 39,412
In France September 21, 1934

2 Claims. (Cl. 107—54)

This invention relates to installations for baking biscuits wherein the paste is cut and molded to the form of the finished biscuit and is deposited on an endless band which passes the biscuits through an oven tunnel, from which they emerge, baked, but still very hot and relatively soft. The conveyer band continues on outside the oven, permitting the biscuits to cool and to take a definite consistency. The biscuits are then detached from the conveyer band and deposited on another conveyer which carries them toward the sorting and packing units.

The bands are plain, perforated, or mesh, but my present improvement is more especially adapted for use with bands made of wire mesh, although it may be used with a perforated ribbon band.

As is known, the wire mesh band facilitates release of vapor from the biscuits while being baked, but for the purpose of making biscuits from soft and semi-soft pastes the wire mesh bands as ordinarily used have presented serious difficulty. On leaving the oven both the wire mesh and the biscuits are still hot and the paste, which has been deposited fresh on the mesh conveyer at the feed end of the oven, has penetrated more or less deeply into the meshes and frequently became stuck between the metal wires during cooling. Then when the biscuit arrives at the last roll around which the conveyer turns, the edge of the biscuit will proceed forward because it is sufficiently rigid so it will not go around the bend of the roll, so that particles of dough which are stuck in the mesh become detached from the biscuit. Consequently the bottoms of the biscuits show undesirable flaws, and some inconvenience arises when a stripping arrangement, such as a scraper, is provided for the purpose of detaching the biscuits from the mesh band. Moreover, pieces of dough remain imprisoned in the mesh and when they again pass through the oven they are again baked, so that ultimately they are transformed into carbon, which clogs the meshes, necessitating cleaning, which is laborious and difficult and which rarely permits the band to regain its original qualities.

The object of the present invention is to provide a practical process whereby the difficulties above mentioned are overcome. The process is characterized by progressively raising the biscuit surface from the mesh band just as the biscuit leaves the oven and before it has cooled and hardened, then replacing the biscuit on the same band, in its original position.

My method or process is not dependent upon any specific mechanism nor its mode of operation, but may be carried out in a number of modes, four of which are shown for the purpose of the description. The process may even be carried out by hand.

In the accompanying drawing, like letters indicate like parts in the several views.

Figure 1:
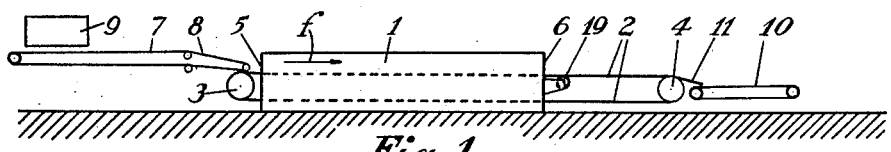
Fig. 1 is a diagrammatic view of a continuously operated installation for baking biscuits.

Referring to Fig. 1, a suitable baking installation includes an oven tunnel 1 in which an endless conveyer band runs in the direction of arrow f, on two rollers 3, 4. Roller 3 is adjacent the feed end 5 of the oven, and roller 4 is beyond the discharge end. In front of the conveyer 2 is an endless band 7, the inclined end 8 of which overlies the band and delivers to it the pieces of fresh dough as they are discharged, for example, from a cutting machine 9. At its discharge end the conveyer 2 delivers to a conveyer 10 over an apron 11.

Figure 2:
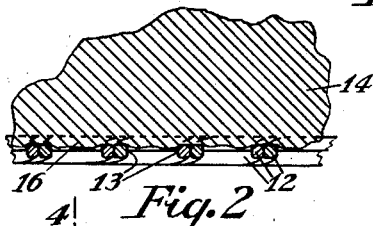
Fig. 2 is a cross section on the line 2—2 of Fig. 3, showing on an enlarged scale a portion of a biscuit on a wire mesh band as it appears when emerging from the delivery end of the oven.
Figure 3:
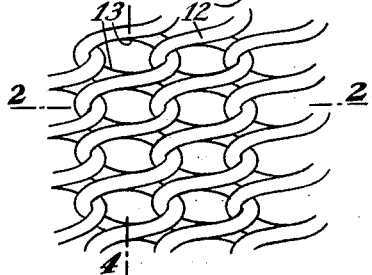
Fig. 3 is a plan view of the band shown in Fig. 2.
Figure 4:
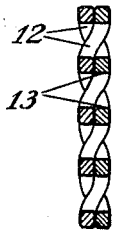
Fig. 4 is a cross section on line 4—4 of Fig. 3.
Figure 5:
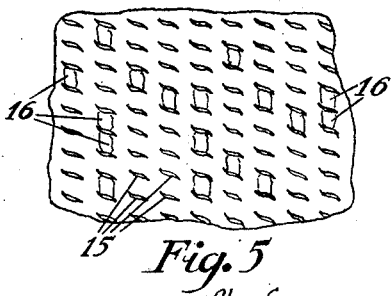
Fig. 5 is a bottom view of a biscuit made of soft dough or paste as it appears after having been baked on a wire mesh of the character shown in Fig. 3, employing the claimed process.

Figs. 2, 3, and 4 show the construction of a wire mesh band 12. Each mesh 13 forms a small prismatic opening. The dough piece 14 penetrates more or less deeply into the meshes 13 and the wires 12 leave imprints 15 in the bottoms of the biscuits more or less deep, according to the hardness or softness of the paste or dough. Between these imprints, illustrated in Fig. 5, are bosses 16, presented by the portion of the dough which penetrates the mesh.

Figure 6:
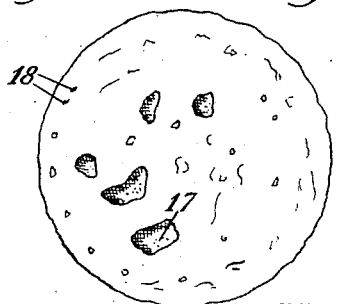
Fig. 6 is a view of the bottom of the biscuit as it appears after having been baked on a plain or unperforated band of ribbon metal.

In Fig. 6 the numerals 17 and 18 represent, respectively blisters or pittings, in order to show the effect on a biscuit surface which has been baked on a plain conveyer band of ribbon metal, this being typical of the undesirable effect of baking on such a surface. That disadvantage is overcome by my improved method, which will now be described.

Assuming the conveyer 2 to be made of mesh, as shown in Figs. 2, 3, 4, it is to be noted that the biscuits at the delivery end of the oven are in such condition that they can be easily raised and separated from the mesh. It is also to be noted that it is only while the mesh is cooling very rapidly that the dough particles are inclined to stick to the meshes, where they have penetrated. This rapid cooling takes place only on the length of conveyer between the discharge end of the oven and the roller 4. The farther the hot biscuits travel from the oven, the stronger they adhere to the mesh, and if allowed to travel clear to the roller 4 the bosses of dough 16, upon leaving the band 2 and passing to the conveyer 10, will stick to the band so tightly that the biscuits can not be detached without breaking off the bosses. Such breakage makes small unsightly indentations on the face of the finished goods, as above mentioned. When the band returns to the feed end 5 of the oven, the adhering pieces will be baked again.

Figure 7:
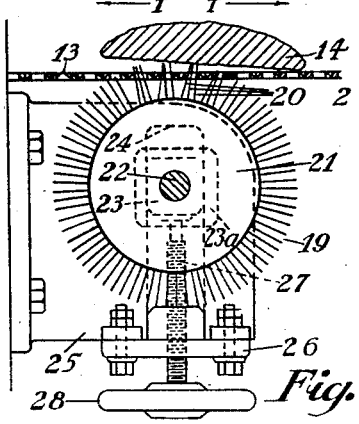
Fig. 7 is a side view, partly in section, showing the lifting action of one type of device for carrying out the method.

According to my method, the biscuit is raised as it arrives at the discharge end of the oven, and is immediately reposed again on the band in its original position, the lifting being done, as is indicated in Fig. 7, by applying the lifting force through the meshes of the band against the bosses 16, so that the bosses are not broken away from the face of the biscuit. It is not necessary that the biscuit shall return exactly to its original position on the mesh band, and in that case the bosses of dough will not, upon being reposed, engage the meshes so deeply. In any event, it is then possible to detach the biscuits from the mesh band at the top of roller 4 without any breaking, tearing, or indenting of the biscuit face.

This result follows from the fact that the rigidity of the biscuit when it leaves the oven is much less than that which it will have when cooled, yet it is sufficiently rigid, so that the biscuit can be raised to the extent indicated without risk of deforming it. Upon being returned to the band it is not subjected to any appreciable tendency to deform, and by the time it has arrived at roller 4 it has sufficiently cooled and hardened to pass across apron 11 onto conveyer 10 without damage.

This method makes it possible to properly bake soft dough articles on a wire mesh band to a degree that has not been possible heretofore.

When attempts have been made to bake soft dough on a wire mesh band, without employing the process above described, the soft dough would penetrate very deely into the mesh and undesirably large pieces of dough would be torn from the face of the biscuits as they passed over the roller 4. These scrap pieces adhered to the wire mesh, became carbonized by their repassage through the oven, clogging the meshes of the band, giving an unsatisfactory appearance to the biscuits and necessitating difficult, laborious and expensive cleaning of the band.

Referring to Fig. 7, there is arranged below the conveyer band 2 a brush 19 with short bristles 20, which may be of bronze, brass, wire, quills, vegetable stems, fibres or the like, mounted on a hub 21 and an axis 22, the length of the hub being equal to the width of the conveyer band. The axis 22 is rotatable in bearings 23 at each end of the hub, the bearings being held by flanges 23a mounted in a slide 24 upon a fixed support 25. The brush 19 is preferably located adjacent the delivery wall 6 of the oven. A cap 26 may be bolted on the seat 25. A screw 27 is threaded through the cap 26 and is provided with a hand wheel 28, whereby the height of the brush 19 can be regulated so that the bristles 20 pass through the mesh 13 and extend slightly above the surface of the mesh.

The traveling conveyer 2 draws the bristles 20 on the top portion of brush 19 in the direction of the arrow f, rotating the brush at a speed equal to the speed of the band.

When the biscuit 14 arrives at the top of the brush, it is engaged by the bristles 20, which project through the mesh, and is raised by them. The biscuit is immediately returned to its original position, or substantially so, or it may be placed somewhat rearwardly on the wire mesh, in the direction of the arrow f'. This loosening of the biscuits when they are in the slight condition of hardness above described avoids any sticking of the bosses 16 in the mesh when the band has become cooled.

Figure 9:
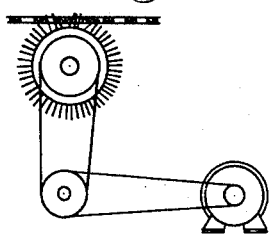
Fig. 9 is a diagrammatic view of the same form of lifting device, as shown in Fig. 7 driven from an independent source of power.

As indicated in Fig. 9, the brush may be power driven to rotate at a tangential speed preferably a little less than the linear speed of the band. In this instance the bristles have a very slightly slower relative movement in the direction of the arrow f' (Fig. 7) in relation to the conveyer band, which tends to displace the biscuits slightly toward the rear.

Figure 8:
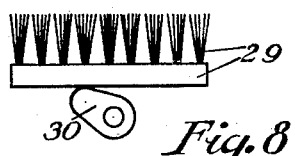
Fig. 8 is a side view of an alternative form of lifting device capable of being actuated by the mesh or perforated band that carries the biscuits through the oven.

As is shown in Fig. 8, the brush 29 may be straight and an up-and-down oscillating movement may be imparted to it by a continuously rotating cam 30, or by any other similar arrangement. Preferably, the upward movement of brush 29 is timed to appropriately enter the bristles into the meshes 13.

Figure 10:
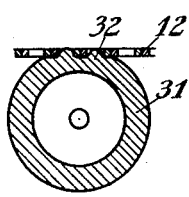
Fig. 10 is a detail sectional view showing a still further means for carrying out the claimed method.

The element which operates below the mesh and raises the biscuits may be other than a brush, for example, in Fig. 10, a rotatable sleeve 31 made of plastic material has a surface which deforms by upward pressure against the mesh band 12, forming bosses 32 which penetrate into the meshes in the manner shown. Such a yieldable boss would enter each mesh, thus assuring the perfect loosening of the biscuits.

By the method above described, I have greatly improved the operating efficiency of bake ovens having wire mesh, or perforated sheet metal bands for conveying the material through the oven, have reduced labor and cost of cleaning the band, besides improving the quality and appearance of the finished baked goods.

Having thus described my invention, what I claim and desire to secure by Letters Patent is:

1. Method of separating baked biscuits from a traveling oven band having mesh-like openings, comprising: applying lifting force, prior to cooling and hardening, to the faces of bosses of baked material that project downwardly into said openings, lifting the bosses in regular order free from engagement with the meshes of the band, lowering the said successively lifted portions of the biscuits onto the moving band in substantially their original positions, further cooling the biscuits, and removing them from the band.

2. Method of separating baked biscuits and the like from a traveling oven band having mesh-like openings, said method comprising: applying lifting force to the lowermost faces of bosses of baked material that project downwardly into said openings, prior to the cooling and hardening of the baked material, lifting such boss portions of each biscuit clear of the band and mesh openings, lowering the said lifted portions of the biscuits onto the moving band in substantially their original positions, whereby the bosses of said baked material are freed from attachment to the marginal edges of the respective meshes without disrupting any considerable portion of the bosses.

ROBERT SAVY.